(12) United States Patent
Suzuki (10) Patent No.: US 12,414,840 B2
(45) Date of Patent: Sep. 16, 2025

(54) ELECTRIC RECIPROCATION GENERATOR FOR REAMER AND ELECTRIC RECIPROCATION GENERATOR ATTACHED WITH REAMER

(71) Applicant: Kazuyoshi Suzuki, Chiba (JP)

(72) Inventor: Kazuyoshi Suzuki, Chiba (JP)

(73) Assignee: Kazuyoshi Suzuki, Chiba (JP)

( * ) Notice: Subject to any disclaimer, the term of this patent is extended or adjusted under 35 U.S.C. 154(b) by 834 days.

(21) Appl. No.: 16/633,456

(22) PCT Filed: Jul. 24, 2018

(86) PCT No.: PCT/JP2018/028361
§ 371 (c)(1),
(2) Date: Jan. 23, 2020

(87) PCT Pub. No.: WO2019/022255
PCT Pub. Date: Jan. 31, 2019

(65) Prior Publication Data
US 2020/0229895 A1    Jul. 23, 2020

(30) Foreign Application Priority Data

Jul. 24, 2017   (JP) .................................. 2017-154711
Feb. 28, 2018   (JP) .................................. 2018-079421

(51) Int. Cl.
*A61C 1/06*      (2006.01)
*A61C 5/46*      (2017.01)

(52) U.S. Cl.
CPC .  *A61C 1/06* (2013.01); *A61C 5/46* (2017.02)

(58) Field of Classification Search
CPC .. A61C 1/06; A61C 1/07; A61C 1/148; A61C 1/185; A61C 5/40; A61C 5/42; A61C 5/46; A61C 17/18; A61C 17/20
See application file for complete search history.

(56) References Cited

U.S. PATENT DOCUMENTS 2,344,605 A * 3/1944 Droegkamp ............. A61C 3/08
                                                     433/133
3,073,031 A * 1/1963 Brenman ................ A61C 1/185
                                                     433/122
(Continued)

FOREIGN PATENT DOCUMENTS

EP      0191574    *  8/1986
EP      2066256 A1   6/2009
(Continued)

OTHER PUBLICATIONS

Extended European search report dated Mar. 26, 2021 issued in the corresponding European patent application No. 18838520.7.
(Continued)

*Primary Examiner* — Edward Moran
(74) *Attorney, Agent, or Firm* — Carrier, Shende & Associates P.C.; Joseph P. Carrier; Jeffrey T. Gedeon (57)    ABSTRACT

A vibration-side housing is attached to a tip of a handle-side housing, and a motor in which a plate cam is attached to a rotating shaft is housed. A vibration tube mounting opening opens at distal end part of the vibration-side housing, and a vibration tube is mounted thereon. The vibration tube is provided to vibrate in a forward-backward direction while urged in the plate cam direction via a spring with respect to the vibration-side housing. The vibration tube contacts with the plate cam via a roller at a rear end part. A reamer mounting opening opens at a tip of the vibration tube, and receives and tightly holds an insertion part of the reamer. The reamer including the bendable needle part is attachable/detachable to the vibration-side housing.

4 Claims, 8 Drawing Sheets

(56) References Cited

U.S. PATENT DOCUMENTS

| | | | | |
|---|---|---|---|---|
| 3,967,380 A | * | 7/1976 | Malata | A61C 1/148 433/128 |
| 4,175,324 A | * | 11/1979 | Arai | A61C 1/18 433/122 |
| 4,341,519 A | * | 7/1982 | Kuhn | A61C 1/07 433/121 |
| 4,773,855 A | * | 9/1988 | Levy | A61C 1/07 433/102 |
| 4,976,625 A | * | 12/1990 | Weissman | A61C 17/005 433/80 |
| 5,330,355 A | * | 7/1994 | Lietaer | A61C 1/07 433/122 |
| 5,775,902 A | | 7/1998 | Matsutani et al. | |
| 6,106,290 A | | 8/2000 | Weissman | |
| 2017/0245960 A1 | * | 8/2017 | Ghadami | A61C 1/141 |

FOREIGN PATENT DOCUMENTS

| | | |
|---|---|---|
| JP | S52-107498 U | 8/1977 |
| JP | S52-107499 U | 8/1977 |
| JP | S54-009990 U | 1/1979 |
| JP | S58-022116 U | 2/1983 |
| JP | S62-12311 U | 1/1987 |
| JP | S63-79911 U | 5/1988 |
| JP | H08-173456 A | 7/1996 |
| JP | H10-165415 A | 6/1998 |
| JP | 2002-095679 A | 4/2002 |
| JP | 2013-099444 A | 5/2013 |
| KR | 101541778 B1 | 8/2015 |

OTHER PUBLICATIONS

Extended European search report dated Oct. 16, 2023 issued in the corresponding European patent application No. 23188141.8.

Office Action dated May 1, 2024 issued in the corresponding Chinese Patent Application No. 202210014999.X with the English machine translation thereof.

* cited by examiner

ELECTRIC RECIPROCATION GENERATOR FOR REAMER AND ELECTRIC RECIPROCATION GENERATOR ATTACHED WITH REAMER

TECHNICAL FIELD

The present invention relates to an electric reciprocal motion generator for electrically generating a reciprocal motion to drive a reamer like a saw to cleanly treat a cavity portion with a fine projection of the reamer. In addition, the reamer as described in the invention is a term including reamers for reaming and files for filing, but also includes cutting tools similar to these in this invention.

BACKGROUND ART

When a dentist performing the treatment of a root canal, such as scraping a wall surface of a root of a patient's cavity, removing the mass of pus clogged at the tip of the root or a filler material that is a trace of previous treatment, and removing a nerve, it is general to use cutting tools referred to as reamers. As described above, the reamers and the files are included in the cutting tools, the reamers are named from reaming (twisting), and the files are named from filing (vertical motion). On shafts of these reamers and files, according to applications or sizes, color coding is performed or symbols or numbers are written. In addition, a root canal length measuring instrument is often used together for such root canal treatment.

SUMMARY OF INVENTION

Technical Problem

However, when a reamer for reaming is operated or a file for filing is operated to remove a dead tooth pulp, in the reamer or file in which a thin metal needle is provided on a small shaft, the size is small to handle only with a fingertip, a delicate movement of the fingertip is required, and thus prolonged treatment is extremely tiring. Especially, in the filing, it is necessary to finely move the reamer up and down in order to feed the reamer to a root apex, and it is actual that keeping gripping a thin reamer with a fingertip is followed by a certain kind of pain. Therefore, if a fingertip is not so dexterous or a fatigue increases even if not, there is also a case where a problem occurs in that a tip of the reamer is unintentionally broken and is left in the root canal.

Meanwhile, in correction dentistry or the like, in order to perform an IPR treatment in which enamel between teeth is shaved, an instrument in which an auto stripper is combined with a contra angle is used. The instrument is configured to reciprocate the auto stripper by converting the rotation of a rotating shaft of a built-in electric motor into a reciprocal motion via a motion conversion mechanism, such as a crank. The inventor searched for the possibility of usage of the contra angle of the correction dentistry for the root canal treatment of general dentistry.

The object of the invention is to solve the above-described problem to achieve any one object or both objects of providing such a dental tool that can facilitate the operation of enlarging a root canal of a tooth to clean the root canal or removing a nerve, thereby reducing a dentist's fatigue to maintain concentration, and efficiently using a contra angle, which is conveniently used for correction dentistry, for the root canal treatment of general dentistry.

Solution to Problem

The above object is achieved by an electric reciprocation generator for a dental reamer including a needlelike part and a supporting shaft, the electric reciprocation generator including: a housing; a reciprocation generation unit housed within the housing; and an attachment/detachment part of the reamer provided to the reciprocation generation unit, and the reamer having the needlelike part that is flexibly bendable being prepared in advance. An electric reciprocal motion is adopted for root canal treatment.

As the reciprocation generation unit, for example, in a case where a rotating shaft of an electric motor is provided with a crank and the attachment/detachment part of the reamer is engaged with the crank, when the electric motor is rotationally driven, the crank rotates, and the rotary motion is converted into a reciprocal motion in the crank and transmitted to the attachment/detachment part of the reamer. Therefore, a dentist can obtain the assistance of reciprocation of the electric motor without feeding the reamer to a root apex of a root canal only with his/her own finger. Therefore, it is not necessary to forcedly perform treatment, and it is possible to maintain concentration with less fatigue to perform an operation. This becomes great assistance for better dental treatment. In addition, it can be seen that the above-described contra angle can be utilized herein. In addition, it is also possible to utilize a linear motor as the electric motor.

In order to convert the rotary motion of the rotating shaft of the electric motor into the reciprocal motion in addition to the rotating shaft having the above-described crank part, optional conversion mechanisms, such as one in which a reciprocation rod is stopped by a pivot pin at one spot of an outer peripheral part of a turntable attached to the rotating shaft of the electric motor (this may also be referred to as a kind of crank), one in which a roller of a distal end part of the reciprocation rod is brought into contact with a cam of the rotating shaft of the electric motor, or one in which the motor control of rotating a rack gear normally and reversely is performed for the engagement between the rack gear and a pinion gear, may be used.

Such a reciprocation generation unit is housed in the housing, and the dentist performs an operation with the housing in his/her hand. As described above, in the reciprocation generation unit, the rotary motion of the rotating shaft of the electric motor is converted into the reciprocal motion, and the reciprocal motion is transmitted to the reamer, and the reamer performs a reciprocal motion. Therefore, the dentist may apply the distal end part of the needlelike part of the reamer to a spot where the root canal is to be treated.

Meanwhile, the shape of the root canal varies depending on individual patients or depending on individual teeth even in the same patient. Generally, the root canal is not linear and is bent at the tip thereof. For this reason, when the needlelike part of the reamer is hard and does not bend, the needlelike part does not reach the root apex of the root canal, and continues applying the striking caused by the reciprocal motion to a wall surface of the bent spot of the root canal. On the contrary, in a case where the needlelike part moves forward with a certain momentum or the needlelike part is forced to enter forward from the bent spot of the root canal, it may now be still difficult to pull out the needlelike part. This occurs in related-art hand files. When this occurs, the following situation is sometimes brought about in practice, that is, the needlelike part is bent or damaged and cannot be used next time, or the needlelike part is lost and remains at the root apex of the root canal if the worst happens, and the root canal is closed without taking out the needlelike part therefrom. This leaves the root canal treatment difficult.

Meanwhile, according to the invention, in addition to being able to more comfortably perform treatment with the assistance of the reciprocation generation unit, the needlelike part has elasticity, and the needlelike part bends flexibly. Therefore, the needlelike part is able to bend well on the bent spot of the root canal and reach the root apex. In contrast, in a case where the needlelike part has no elasticity and is rigid, the needlelike part does not easily move forward along the root canal, hits the bent spot of a root canal, and results in repeatedly applying impact to a healthy region. This has been clarified by the inventor's keen researches.

Additionally, the above object is achieved by an electric reciprocation generator for a dental reamer including a needlelike part and a supporting shaft, the electric reciprocation generator including: a housing; a reciprocation generation unit housed in the housing; and an attachment/detachment part of the reamer provided in the reciprocation generation unit, and the attachment/detachment part of the reamer being passively pivotable with respect to the housing with a longitudinal direction of the reamer as an axis. The attachment/detachment part of the reamer being pivotable means that the needlelike part is pivotable.

The term "pivoting" as used herein means that the pivoting motion is passive and free rather than being actively pivoted by applying the driving force of the electric motor or the like. In the above, it has been described that it is important that the needlelike part bends flexibly with respect to root canals of various shapes. Moreover, here, the attachment/detachment part of the reamer is pivotable with respect to the housing with the longitudinal direction of the reamer as an axis. As described above, since the shape of the root canal is complicated, even though the needlelike part can respond to the bent spot of the root canal, and can reach the root apex well, a forward and backward operation may become heavy such that the needlelike part is twisted due to the complicated shape of the root canal, the situation of a cavity, or the like. This is because the needlelike part receives resistance in the direction of the pivoting. In addition, if an attempt to cause a pivoting motion with a driving force is made, similarly, the needlelike part receives resistance in the direction of the pivoting.

Thus, when the attachment/detachment part of the reamer is pivotable with respect to the housing with the longitudinal direction of the reamer as the axis, the attachment/detachment part pivots naturally even if the above resistance is received and does not resist the resistance, and thus the forward and backward operation does not become heavy easily. Moreover, this function is effective not only for files that perform filing (vertical motion) but also for reamers that perform reaming (twisting). This has been clarified by the inventor's keen researches. In addition, when free pivoting occurs, a phenomenon in which the needlelike part enters avoiding a filling or the needlelike part moves back to take out an old filling while winding the filling therearound is also sometimes observed.

Meanwhile, although there is a related-art contra angle that includes a reciprocation generation unit similarly to the invention and performs reciprocation, the application of the contra angle is different and is to perform IPR treatment with an auto stripper. Therefore, the distance range of the reciprocation is set to about 0.3 mm. However, in the root canal treatment that is the purpose of use of the invention, in practice, in order to feed the reamer to the root apex of the root canal, the inventor has been able to ascertain it is preferable that the reciprocation generation unit is designed to be capable of reciprocating the reamer at an any distance within a width of 0.5 mm to 2.0 mm. Therefore, a designer may perform a design by adopting means capable of steplessly adjusting this range or adopting means capable of selecting several predetermined steps. Of course, a fixed range may be adopted.

In addition, when the range of reciprocation of the needlelike part is within a width of 0.5 mm to 2.0 mm, there are working effects that are clearly felt unlike the case of about 0.3 mm. When the dentist holds the housing by his/her hand and tries to lightly touch the needlelike part on the spot of the root canal in which the needlelike part is currently contained, a situation in which the needlelike part further enters forward while bending is felt. Then, the needlelike part can enter forward from there in the same way. Additionally, for example, if the range of reciprocation of the needlelike part is 1.3 mm, the bending of the needlelike part is also relatively large. Therefore, there is also a working effect that a force that could be referred to as a breakthrough force against a cavity portion is clearly felt unlike the case of about 0.3 mm.

In addition, the speed of the reciprocation generated by the reciprocation generation unit can also be made variable by controlling the electric motor. Then, for example, the treatment of adjusting the reciprocation of the reamer in accordance with the bending condition of the root canal with an individual difference is allowed. More specifically, in a case where the degree of the bending is large, the reamer is slowly reciprocated, for example.

Since this reamer for root canal treatment is replaceable by the attachment/detachment part, it is possible to appropriately perform the replacement in accordance with the type of treatment, the size of a cavity portion, or the like. Some general reamers may be suitable for the invention. Among them, although the supporting shaft of the reamer may be smaller than the attachment/detachment part, an adapter to be interposed between both may be provided.

The attachment/detachment part may include a slip-out prevention part with which the attachment/detachment part fastens the reamer. As described above, the reamer receives the reciprocal motion in the longitudinal direction. If this becomes important from the viewpoint of the slip-out prevention, for example, a study for making the slip-out of the reamer difficult by screwing or the like may be performed.

Next, the attachment/detachment part may be pivotable (angle-adjustable) with respect to the housing. When the dentist holds the housing, the dentist can adjust the angle of the attachment/detachment part with respect to the housing with his/her fingertip such that the reamer enters the root canal conveniently. In addition, in a case where the housing is configured to be divided into a side (vibration-side housing) on which the attachment/detachment part is provided and a side (handle-side housing) on which the dentist holds the housing with his/her hand, the attachment/detachment part belongs to the vibration-side housing, and the housing for the attachment/detachment part can be regarded as the handle-side housing. In addition, the housing may include an illumination unit for illuminating a tooth. This contributes to enhancing the accuracy of treatment together with a root canal length measuring instrument or the like.

Next, the electric reciprocation generator for a reamer of the invention may further include an electric vibration generation unit that vibrates the reamer within the housing. As the electric vibration generation unit, for example, when the electric motor is rotationally driven with a weight being attached to the rotating shaft of the electric motor in an eccentric state (eccentric weight), the vibration is generated and the housing that houses the electric motor vibrates. Then, since the above reamer is provided in the housing by the attachment/detachment part, the vibration of the electric motor is transmitted to the reamer. Therefore, since the assistance of not only reciprocation of the reamer but also the vibration of the electric motor can be obtained, more efficient treatment is allowed. This becomes great assistance for better dental treatment. In addition, a configuration in which one electric motor is made to play two roles of the generation of the reciprocation and the generation of the vibration is also possible. For example, a design in which a shaft of the eccentric weight is attachable to the rotating shaft of the electric motor via a gear train is established. The rotating shaft of the electric motor is a rotating shaft in which, for example, a crank mechanism for reciprocation generation is configured.

Next, the attachment/detachment part may be configured such that the reamer is inserted from a rear side and a tip (needlelike part) of the reamer is taken out from a front side, and a fixing part that stops the inserted reamer may be provided at a rear part of the attachment/detachment part. For the attachment of the reamer, in addition to the configuration in which a mounting opening for mounting the supporting shaft of the reamer including the needlelike part and the supporting shaft of the reamer from the front side is provided on the front side of the attachment/detachment part, there is a configuration as set forth in this claim. By stopping the reamer with the fixing part after the reamer is inserted, the reamer is firmly fixed to the electric reciprocation generator.

Although the former configuration also has no problem, in a case where there is resistance to mounting or detaching the supporting shaft of the reamer from the front side in such a manner that the needlelike part of the reamer is directed to the dentist, it is preferable that the entire supporting shaft of the reamer is configured to be capable of being be inserted or detached in such a manner that the needlelike part of the reamer is separated from the dentist from the rear side of the attachment/detachment part. Additionally, the insertion and detachment method is relatively easier to use.

In addition, a configuration in which the attachment/detachment part mounts the reamer on a side surface of the attachment/detachment part is also possible. That is, the side surface of the attachment/detachment part is provided with a groove part for receiving the supporting shaft of the reamer. Since the groove part is provided up to a distal end part of the attachment/detachment part, the needlelike part of the reamer protrudes to the distal end part of the attachment/detachment part. Alternatively, a design in which the side surface of the attachment/detachment part is provided with groove parts for receiving the supporting shaft and the needlelike part of the reamer and only the groove part for the needlelike part is provided to reach the distal end part of the attachment/detachment part is also possible.

In addition, the role of the weight may be given to the fixing part that fixes the reamer to the electric reciprocation generator. In this case, a piercing force in the meaning that the weight of the weight is applied to the reciprocation of the reamer can be raised. Moreover, a plurality of types of fixing parts having different weights are prepared, and the dentist may be able to freely perform the replacement in accordance with his/her preference, the situation of treatment from time to time, or the like. In addition, it is also possible to provide the weight separately from the fixing part.

Next, in a case where the attachment/detachment part of the reamer is pivotable with respect to the housing with the longitudinal direction of the reamer as the axis, the attachment/detachment part may be configured such that the reamer is inserted from the rear side and the tip of the reamer is taken out from the front side, and the fixing part that stops the inserted reamer may be provided at the rear part of the attachment/detachment part, and the distal end part of the attachment/detachment part may protrude from the housing so as to be capable of being touched with a finger.

In a case where the attachment/detachment part of the reamer is pivotable with respect to the housing, a problem does not occur so much if the pivoting angle is less than 360 degrees. However, there is a problem that occurs if the pivoting angle becomes free beyond 360 degrees. That is, the fixing part that stops the reamer inserted into the attachment/detachment part is at the rear part of the attachment/detachment part. However, if the fixing part is of a twisted type like a screw, the attachment/detachment part is rotated when this screw is twisted. If the pivoting angle is less than 360 degrees, the time when it becomes impossible for the attachment/detachment part to pivot beyond 360 degrees comes. Thus, the screw can be tightened after that. However, if the pivoting angle is 360 degrees or more, there is no ground on which the screw is closed. Thus, if the distal end part of the attachment/detachment part is made to protrude from the housing so as to be capable of being touched with a finger, the screw can be tightened while applying the finger to the distal end part so that the attachment/detachment part is not pivoted. This mechanism is effective even when applied to a case where the pivoting angle is less than 360 degrees.

Next, the side wall part of the attachment/detachment part may be provided with a thin part or a hole part for weight reduction. At first glance, this configuration may be considered as being contrary to the problem of the weight of the weight as described above. However, this configuration solves a problem different from this and solves a problem related to the total weight of the electric reciprocation generator. That is, it may be said the lighter total weight of the electric reciprocation generator is better for the dentist because handling becomes easier. The attachment/detachment part according to the present claims is suitable for such a case.

Meanwhile, an electric driving tool for a reamer according to any one of the above claims may also include a dental reamer including a needlelike part and a supporting shaft, and the needlelike part may bend flexibly. That is, the electric driving tool as described above is provided with the reamer in which the needlelike part bends flexibly.

Advantageous Effects of Invention

According to this invention, by providing an electric reciprocation generator for a dental reamer including: a needlelike part and a supporting shaft, the electric reciprocation generator including a housing; a reciprocation generation unit housed within the housing; and an attachment/detachment part of the reamer provided in the reciprocation generation unit, and the reamer having the needlelike part that is flexibly bendable being prepared in advance, a dentist does not feed the reamer to the root apex of the root canal only with his/her own finger, and can obtain the assistance of reciprocation of the electric motor and the assistance of smooth reciprocation resulting from the bendability and the elasticity of the needlelike part. Therefore, the effects that it is not necessary to forcedly perform treatment, the operation time becomes shorter than before, and it is possible to maintain concentration with less fatigue to perform an operation are exhibited.

DESCRIPTION OF EMBODIMENTS

Although examples of the invention will be described below with reference to the drawings, the invention is not limited to these. In addition, although reamers described in the following examples refer to files for filing based on the above definition, the reamers can also be designed to be used as reamers for reaming or cutting tools similar to these.

Example 1

Figure 1:
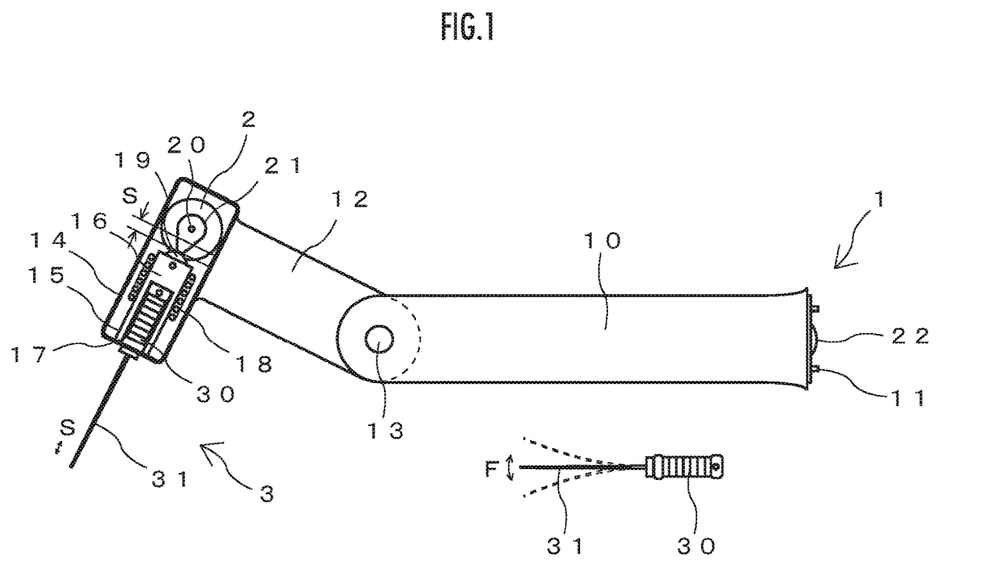
FIG. 1 is an illustrative view illustrating a portion of Example 1 in a cutaway manner.
Figure 2:
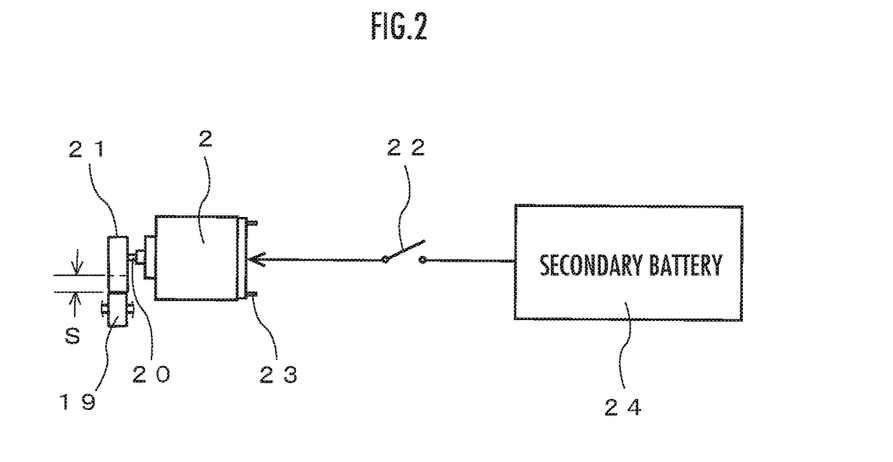
FIG. 2 is an illustrative view schematically illustrating a circuit portion.

A reciprocation generator 1 for a reamer 3 of this example illustrated in FIGS. 1 and 2 is simply configured such that a motor 2, which is supplied with electrical power from a secondary battery 24 (not illustrated in FIG. 1) housed inside a handle-side housing 10, is driven when a power switch 22 is pressed. The handle-side housing 10 is connected to a supporting part 12 of which the angle is adjustable by a pivot shaft 13 via the pivot shaft 13, a vibration-side housing 14 is attached to the supporting part 12, and the motor 2 is housed in the vibration-side housing 14. In addition, the reamer 3 includes an insertion part 30 and a needle part 31, and the needle part 31 has elasticity and bends flexibly. This example is developed as the reciprocation generator 1 that is a set with the reamer 3.

A plate cam 21 is attached to a rotating shaft 20 of the motor 2, and the plate cam 21 is brought into contact with a roller 19 to be described below. Reference sign 23 in the drawing denotes an input terminal that connects lead wires that connect the secondary battery 24 and the power switch 22 to the motor 2. It is configured that, whenever the power switch 22 is pressed once, the motor 2 which is supplied with electrical power from the secondary battery 24 sequentially repeats ON/OFF.

Meanwhile, a vibration tube mounting opening 15 opens at a distal end part of the vibration-side housing 14, and a vibration tube 16 is mounted on the vibration tube mounting opening. The vibration tube 16 is provided so as to be capable of vibrating in a forward-backward direction while being urged in the direction of the above plate cam 21 via a spring 18 with respect to the vibration-side housing 14.

Additionally, the vibration tube 16 is provided so as to come into contact with the above plate cam 21 via the roller 19 at a rear end part thereof.

Additionally, a reamer mounting opening 17 opens at a distal end part of the above vibration tube 16, and is capable of receiving and tightly holding the insertion part 30 of the above reamer 3. In this way, although the reamer mounting opening 17 can freely attach and detach the reamer 3, the reamer is tightly inserted such that it is difficult to be disengaged by at least reciprocal vibration in the forward-backward direction by the plate cam 21. In addition, the above power switch 22 is provided at a bottom part of the handle-side housing 10, and charging terminals 11 for charging the above secondary battery 24 are attached to both sides of the power switch.

When the plate cam 21 of the motor 2 rotates, the roller 19 that comes into contact with this plate cam is pushed by the plate cam 21, or when the roller is not pushed, the roller is pulled by the spring 18 to cause the reciprocal vibration of the vibration tube 16 in which the roller 19 is provided. Therefore, as the reamer 3 inserted into the vibration tube 16 performs the reciprocal vibration and the needle part 31 of the reamer 3 is inserted into the root canal, the needle part 31 can be easily fed to a root apex of the root canal. In addition, the angle of the vibration-side housing 14 is adjustable with respect to the handle-side housing 10, via the pivot shaft 13. Therefore, in the case of treatment, a dentist can adjust the reamer 3 at a just right angle. Additionally, an optional control means may be provided for the motor 2 to enable variable control of the rotating speed of the motor. Then, the reciprocation speed of the reamer 3 can be adjusted. Additionally, although the rechargeable secondary battery 24 can be used as a power source of the motor 2, a configuration in which the secondary battery is replaced with a primary battery is also possible. These are optional design items.

In addition, in this example, the plate cam 21 is used to convert the rotary motion of the motor 2 into the reciprocal vibration of the vibration tube 16. The roller 19 is for making the contact of the plate cam 21 with the vibration tube 16 smooth. Reference sign S in the drawing represents the stroke length of the reciprocal motion. Arrow F represents that the needle part of the reamer 3 is flexible. In the invention, optional mechanisms other than the plate cam 21 may be adopted for the above motion conversion. Here, for the sake of understanding, examples of three types of motion conversion mechanisms are given in FIGS. 3A to 3C.

Figure 3A:
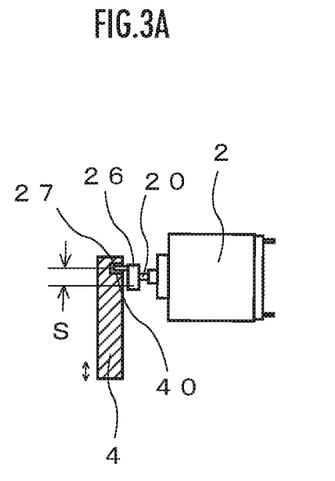
FIGS. 3A to 3C are illustrative views of a mechanism that replace a cam 21.

FIG. 3A illustrates a motion conversion mechanism formed by providing a pin 27 in a region away from the rotating shaft 20 on a rotating plate 26 attached to the rotating shaft 20 of the motor 2 and locating the pin 27 in a pin hole 40 opening in a side wall part of the reciprocation rod 4. When the rotating plate 26 performs the rotary motion and the pin 27 rotates, the reciprocation rod 4 itself performs a reciprocal motion while the region of the reciprocation rod 4 engaged with the pin 27 is swung. The stroke length is equivalent to the amplitude of the pin 27. The reamer 3 is attached to the reciprocation rod 4 (not illustrated).

Figure 3B:
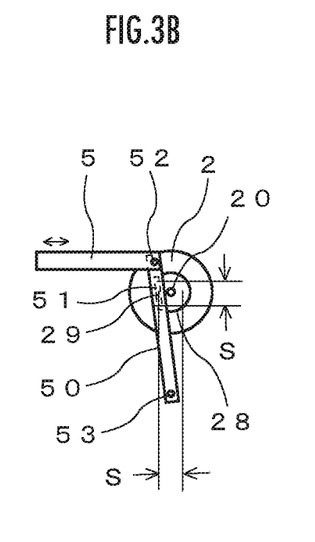

FIG. 3B illustrates a motion conversion mechanism formed by providing a pin 29 in a region away from the rotating shaft 20 on a rotating plate 28 attached to the rotating shaft 20 of the motor 2, locating the pin 29 in a sliding groove 51 provided in a longitudinal direction on a side surface on the other side of a link rod 50 pivotably stopped by a pivot shaft 53 on one side thereof, and pivotably coupling the reciprocation rod 5 to the other side of the link rod 50 via a coupling shaft 52. When the rotating plate 28 performs a rotary motion and the pin 29 rotates, the link rod 50 engaged with the pin 29 is swung about the pivot shaft 53, and consequently, the reciprocation rod 5 performs a reciprocal motion. The stroke length is equivalent to the amplitude of the pin 29. The reamer 3 is attached to the reciprocation rod 5 (not illustrated).

Figure 3C:
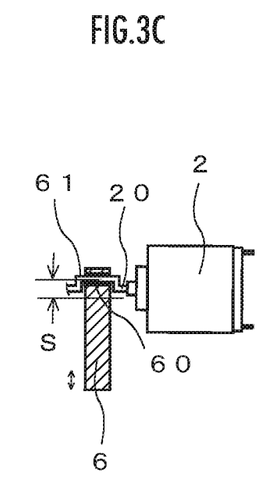

FIG. 3C illustrates a motion conversion mechanism formed by providing the reciprocation rod 6 having an insertion hole 60 bored on one side for a crankshaft 61 attached to the rotating shaft 20 of the motor 2 and passing the crankshaft 61 through the insertion hole 60. When the crankshaft 61 performs a rotary motion, the reciprocation rod 6 engaged with the crankshaft 61 performs a reciprocal motion. The stroke length is equivalent to the amplitude of the crankshaft 61. The reamer 3 is attached to the reciprocation rod 6 (not illustrated).

Example 2

Figure 4:
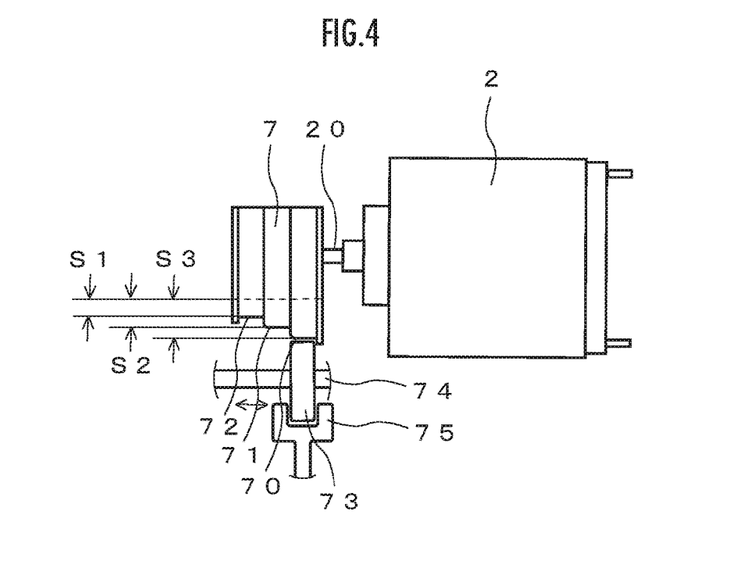
FIG. 4 is an illustrative view of Example 2.

A multi-stage plate cam 7 of the reciprocation generator of this example is illustrated in FIG. 4. This multi-stage plate cam is one in which a first stage cam 70, a second stage cam 71, and a third stage cam 72 are integrally provided, and includes a region that becomes flush, and a stepped region opposite to the flush region by 180 degrees. A roller 73 is brought into elastic contact with the multi-stage plate cam 7, and the multi-stage plate cam is engaged with the roller 73 by a bifurcated switching rod 75 for moving the roller 73 right and left. In addition, the multi-stage plate cam 7 is attached to the rotating shaft 20 of the motor 2, and the roller 73 is rotatable by a rotating shaft 74.

In a state where the rotating shaft 20 of the motor 2 is rotated, the stroke length of the rotating shaft 74 of the roller 73 is different depending on whether the roller 73 is brought into contact with the first stage cam 70, the second stage cam 71, or the third stage cam 72. In this example, a shortest stroke length S1 of 0.5 mm is set in the case of the first stage cam 70, a middle stroke length S2 of 1.0 mm is set in the case of the second stage cam 71, and a longest stroke length S3 of 2.0 mm is set in the case of the third stage cam 72. Adjustment which cam the roller 73 is brought into contact with is performed by manually operating the switching rod 75 right and left. By applying a lateral force to the switching rod 75, the lateral movement of the roller 73 is performed at the region that becomes flush. In addition, although it is also possible to make a design in which a related art capable of adjusting the stroke length steplessly, not in multiple steps, is adopted, the detailed description is omitted herein so as not to become complicated.

Example 3

Figure 5:
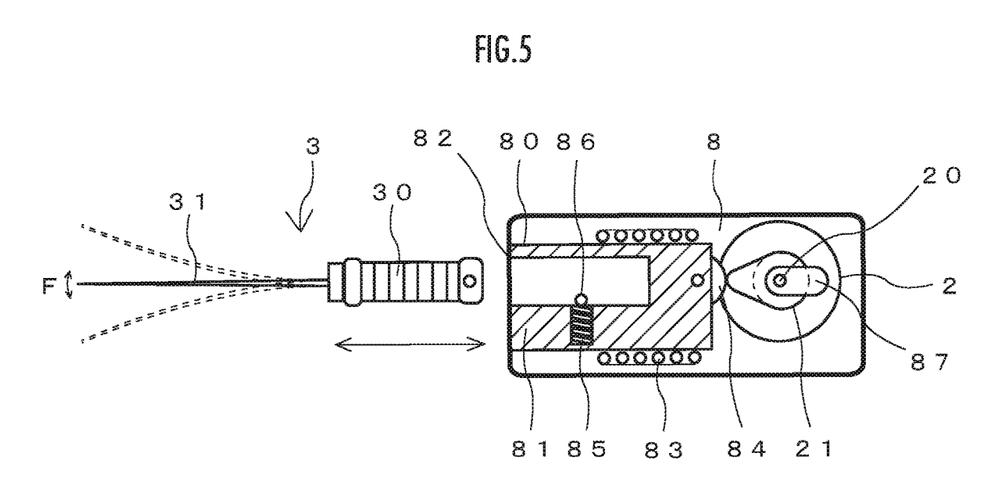
FIG. 5 is an illustrative view of Example 3.

One illustrated in FIG. 5 relates to a vibration-side housing 8 of the reciprocation generator of this example. The plate cam 21 is attached to the rotating shaft 20 of the motor 2, and the plate cam 21 is brought into contact with a roller 84 to be described below. A vibration tube mounting opening 80 opens at a distal end part of the vibration-side housing 8, and a vibration tube 81 is mounted on the vibration tube mounting opening. The vibration tube 81 is provided so as to be capable of vibrating in the forward-backward direction while being urged in the direction of the above plate cam 21 via a spring 83 with respect to the vibration-side housing 8. Additionally, the vibration tube 81 is provided so as to come into contact with the above plate cam 21 via the roller 84 at a rear end part thereof.

Additionally, the vibration tube 81 is provided with a reamer mounting opening 82 of the insertion part 30 of the reamer 3, and a ball 86 urged by a pressing spring 85 protrudes into the reamer mounting opening 82. Therefore, when the insertion part 30 of the reamer 3 is inserted from the reamer mounting opening 82, the insertion part 30 is pressed by the ball 86 and is tightly mounted. For this reason, although the reamer 3 is attachable and detachable with respect to the vibration tube 81, it is difficult for the reamer to be disengaged by at least the reciprocal vibration in the forward-backward direction by the plate cam 21.

Moreover, in this example, an eccentric weight 87 is attached to the rotating shaft 20 of the motor 2. When the motor 2 is driven, the eccentric weight 87 rotates to generate vibration, and a housing that houses the motor 2, that is, the vibration-side housing 8 vibrates. Since the reamer 3 is provided in the vibration tube 81, the vibration of the motor 2 is transmitted to the reamer 3. Therefore, the assistance of not only the reciprocation of the reamer 3 but also the vibration of the eccentric weight 87 can be obtained. Arrow F represents that the needle part of the reamer 3 is flexible. In addition, it is difficult for the reamer 3 to be disengaged from the vibration tube 81 even by the vibration of the eccentric weight 87.

Example 4

Figure 6:
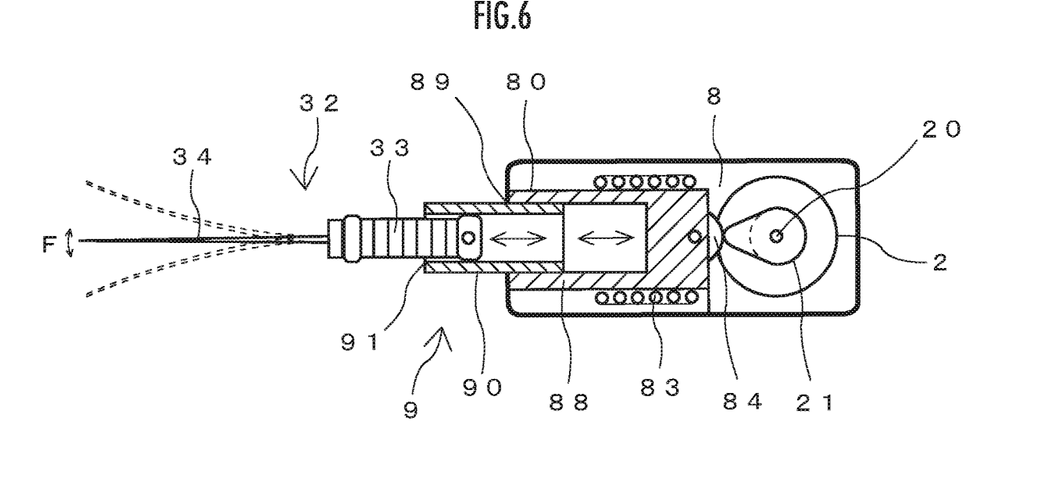
FIG. 6 is an illustrative view of Example 4.

One illustrated in FIG. 6 relates to a vibration tube 88 of the reciprocation generator of this example, and an adapter 9 to be detachably mounted on the vibration tube 88. A reamer 32 includes an insertion part 33 and a needle part 34, and in a case where the thickness of the insertion part 33 of the prepared reamer 32 and the thickness of the reamer mounting opening of the vibration tube 88 do not match with each other, the above adapter 9 may be used.

The plate cam 21 attached to the rotating shaft 20 of the motor 2 comes into contact with the roller 84 of the vibration tube 88. An adapter mounting opening 89 opens at a distal end part of the vibration tube 88, and the adapter 9 can be detachably mounted on the adapter mounting opening. The vibration tube 88 is provided so as to be capable of vibrating in the forward-backward direction while being urged in the direction of the above plate cam 21 via the spring 83 with respect to the vibration-side housing 8. Additionally, the vibration tube 88 is provided so as to come into contact with the plate cam 21 via the roller 84 at a rear end part thereof.

The adapter 9 to be detachably mounted on the adapter mounting opening 89 in the vibration tube 88 is a hollow rubber tube 90, and a distal end part thereof serves as a reamer mounting opening 91. The internal diameter of the rubber tube 90 is slightly smaller than the diameter of the insertion part 33 of the reamer 32 to be mounted on the rubber tube, and the external diameter of the rubber tube 90 is slightly larger than the adapter mounting opening 89 of the vibration tube 88. Therefore, the adapter 9 can detachably mount the reamer 32 of which the size does not match, and it is difficult for the reamer to be disengaged by at least the reciprocal vibration in the forward-backward direction by the plate cam 21.

Example 5

Figure 7:
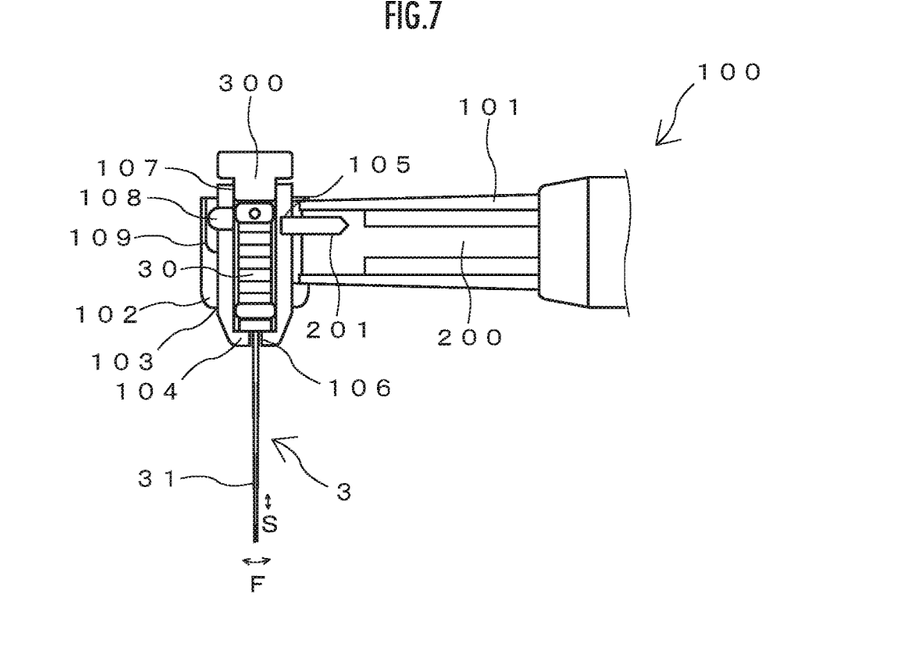
FIG. 7 is an illustrative view illustrating a portion of Example 5 in a cutaway manner.

A reciprocation generator 100 of this example illustrated in FIG. 7 is different from the reciprocation generator 1 of Example 1 illustrated in FIG. 1 in the following points. That is, in the reciprocation generator 1, in the case of treatment, the vibration-side housing 14 is configured to be adjustable in angle to the handle-side housing 10 via the pivot shaft 13 so that the dentist can adjust the reamer 3 at a suitable angle. In contrast, in the reciprocation generator 100 of Example 5, a vibration-side housing 102 is fixed to a handle-side housing 101. Although the angle cannot be adjusted between the vibration-side housing 102 and the handle-side housing 101, this is sufficient.

A micro motor (not illustrated) is housed within the handle-side housing 101, and in Example 5, the micro motor is configured to be rotationally driven with the electrical power from a chair unit power source. A rotating shaft of the micro motor is coupled to the geared box (not illustrated) that is provided inside the handle-side housing 101, and an output terminal of the geared box is connected to a rotating shaft 200, a pin 201 is eccentrically provided at a distal end part of the rotating shaft 200, and the pin 201 is engaged with a pin hole 105 provided in a side surface part of the vibration tube 104. The pin 201 is circular, and the pin hole 105 is a slightly larger hole than the pin 201. In addition, the reamer 3 used in this example includes the insertion part 30 (knob part) and the needle part 31, and the needle part 31 bends flexibly.

Next, a vibration tube mounting opening 103 opens at a distal end part of the vibration-side housing 102, and the vibration tube 104 is mounted on the vibration tube mounting opening. The vibration tube 104 is provided inside the vibration-side housing 102 so as to be capable of vibrating in the forward-backward direction (upward-downward direction of FIG. 7). Additionally, a guide pin 108, which protrudes from the side surface part of the vibration tube 104, is inserted into a guide groove 109 provided in the forward-backward direction (a direction in which the reamer 3 reciprocates) inside the vibration-side housing 102.

Additionally, a reamer mounting opening 107 opens at a rear end part of the above vibration tube 16, and when the above reamer 3 is mounted from the reamer mounting opening, the reamer is configured to be capable of being pushed in until the needle part 31 slips out of a needle-through hole 106 of the vibration tube 104 and a distal end part of the insertion part 30 comes into contact with the inside of the above needle-through hole 106. In addition, the reamer 3 can be fixed by screwing a screw cap 300 into the above reamer mounting opening 107. Therefore, replacement of the reamer 3 is performed by attaching and detaching the screw cap 300.

Since the reamer 3 is configured to be capable of being attached and detached not from the distal end part side of the vibration tube 16 but from the rear end part side thereof, the feature of this example is that the mounting of the reamer 3 is more convenient. In addition, since the pin 201 of the rotating shaft 200 is fitted into the pin hole 105 of the side wall part of the vibration tube 104 from the lateral direction, the feature of the invention is also that the rotation of the rotating shaft 200 only causes the vibration tube 104 to vibrate in the forward-backward direction and does not act to forcibly rotate the vibration tube 104 around the needle part 31 of the reamer 3. However, in consideration of a case where causing even slight pivoting vibration is not good, the configuration of the guide pin 108 and the guide groove 10 as described above is provided. Arrow S represents the direction of the stroke, and arrow F represents that the needle part of the reamer 3 is flexible.

Example 6

Figure 8A:
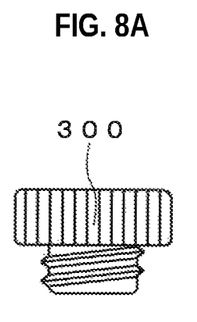
FIGS. 8A to 8C are illustrative views of Example 6.
Figure 8B:
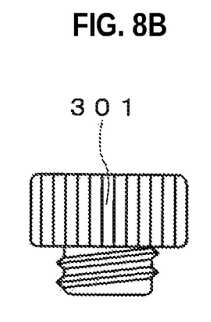
Figure 8C:
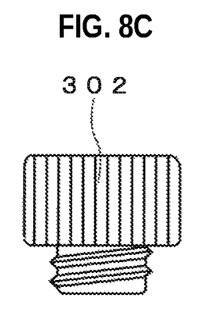

A reciprocation generator 400 of this example illustrated in FIGS. 8A to 8C adopts the following configuration in the reciprocation generator 100 of the above-described Example 5. That is, a screw cap 301 (E) that is slightly heavier than the screw cap 300 (D) and a screw cap 302 (F) that is slightly still heavier than the screw cap 300 (D) are prepared so that the screw caps having different weights can be selected depending on dentist's preference.

Since the materials of the respective screw caps are the same, the weight varies depending on the size of knob portions. However, instead, by making the materials different from each other, even the screw caps of the same size can have different weights. These matters may be freely designed.

Example 7

Figure 9:
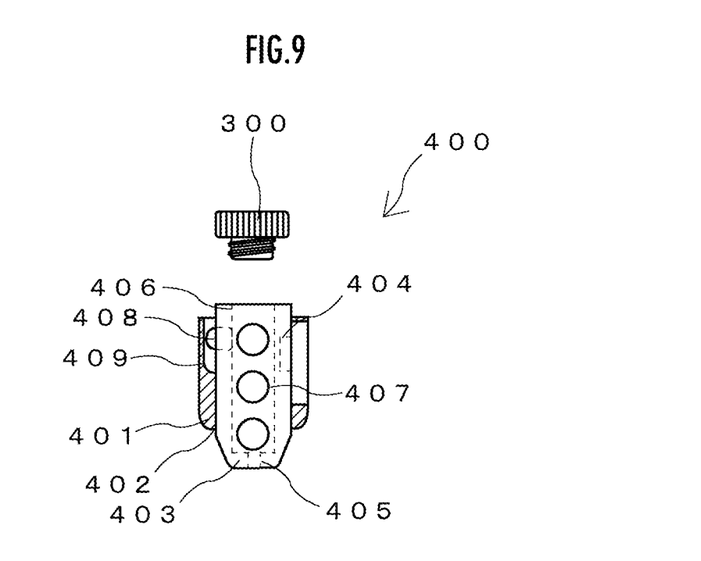
FIG. 9 is an illustrative view of Example 7.

This example illustrated in FIG. 9 adopts the following configuration in the above-described Example 5. That is, by providing a cutout part 407 in a side wall part of a vibration tube 403, the weight of the vibration tube 403 is made lighter. Therefore, the total weight of the reciprocation generator 400 is also made smaller.

In the drawing, reference sign 401 denotes a vibration-side housing, reference sign 402 denotes a vibration tube mounting opening, reference sign 404 denotes a pin hole, reference sign 405 denotes a needle-through hole, reference sign 406 denotes a reamer mounting opening, reference sign 408 denotes a guide pin, and reference sign 409 denotes a guide groove. The shape and the number of cutout parts 407, the positions where the cutout parts are provided, and the like are optional design items. In a case where it is not preferable that a hole opens as a cutout part, a study for filling the cutout part with a light material may be performed.

Example 8

Figure 10:
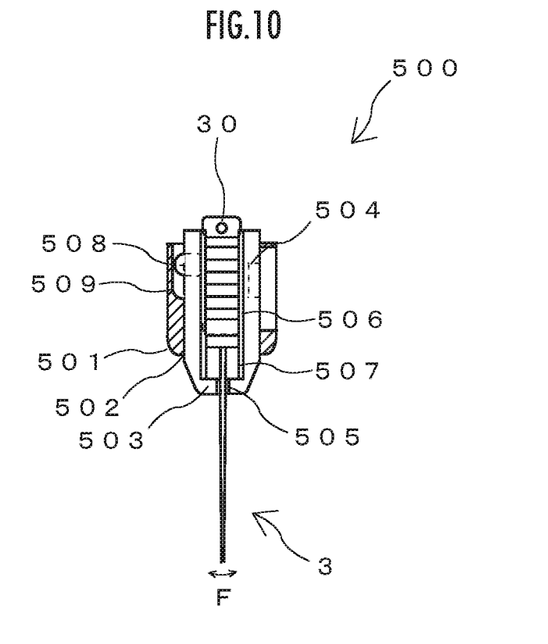
FIG. 10 is an illustrative view of Example 8.

A reciprocation generator 500 of this example illustrated in FIG. 10 has a feature in that the reamer 3 is configured to be capable of being attached and detached from a side wall part side of a vibration-side housing 501.

That is, a vibration tube mounting opening 502 opens at a distal end part of the vibration-side housing 501, and a vibration tube 503 is mounted on the vibration tube mounting opening. The vibration tube 503 is provided inside the vibration-side housing 501 so as to be capable of vibrating in the forward-backward direction (upward-downward direction of FIG. 10). Additionally, the pin 201 described in Example 5 is fitted into a pin hole 504 provided at a rear end part of the vibration tube 503. Additionally, a guide pin 508, which protrudes from the rear end part of the vibration tube 503, is inserted into a guide groove 509 provided in the forward-backward direction inside the vibration-side housing 501.

Additionally, a reamer mounting opening 506, which leads to the rear end part side, opens at a side wall part of the vibration tube 503, and a reamer mounting opening (not illustrated) also open at the side wall part of the vibration-side housing 501 in alignment with the position of the reamer mounting opening 506. Also, a receiving rubber 507 of the reamer 3 is attached to an inner wall of the vibration tube 503. Reference sign 505 in the drawing denotes a needle-through hole of the reamer 3.

The feature of the example is that the reamer 3 is configured to be capable of being attached and detached not from the distal end part side of the vibration tube 503 and the rear end part side thereof but from the side wall part side. The reamer mounting opening of the vibration-side housing 501 and the reamer mounting opening 506 of the vibration tube 503 positionally coincide with each other, and when the reamer 3 is pushed into the vibration tube 503 from the reamer mounting opening 506, the reamer is tightly held by the receiving rubber 507 present in the inner wall of the vibration tube 503. In addition, in order to take out the reamer 3 from the vibration tube 503, a fingertip may be hung on the insertion part 30 (a knob part) of the reamer 3 that comes out from the rear end part of the vibration tube 503. In this way, attachment and detachment of the reamer 3 performed from the side wall part side of the vibration tube 503 are also easy and convenient.

Meanwhile, the pin 201 described in Example 5 is fitted into the pin hole 504 provided in the rear end part of the vibration tube 503. Although not illustrated, the micro motor is housed inside the handle-side housing, and in Example 8, the micro motor is configured to be rotationally driven with the electrical power from the chair unit power source. The rotating shaft of the micro motor is coupled to the geared box provided at a distal end portion of the handle-side housing, the output terminal of the geared box is connected to the rotating shaft 200, and the above pin 201 is provided in the rotating shaft 200 and is engaged with the pin hole 504.

Example 9

Figure 11:
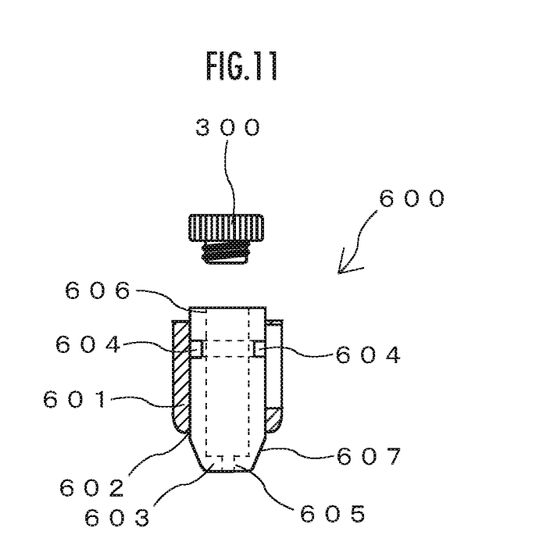
FIG. 11 is an illustrative view of Example 9.
Figure 12:
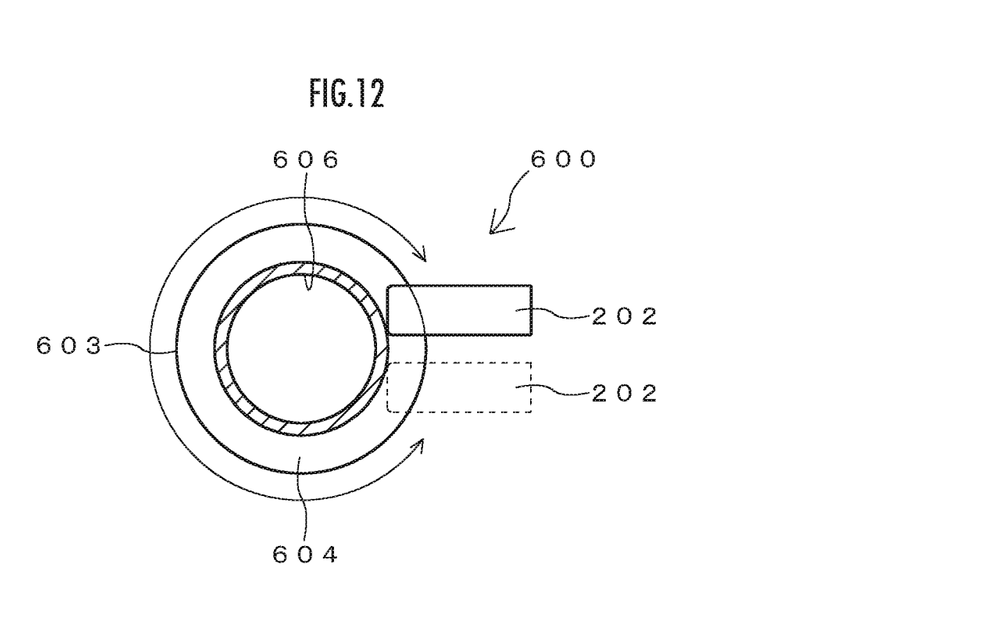
FIG. 12 is an illustrative view of an operating state.

Although the configuration of a reciprocation generator 600 of this example illustrated in FIGS. 11 and 12 imitates that of the reciprocation generator 100 in the above-described Example 5, the reciprocation generator 600 does not include a configuration of the guide groove 109 and the guide pin 108. In the reciprocation generator 600, characteristically, a pin hole 604 for inserting the pin 202 is engraved over 360 degrees at an outer peripheral part of the vibration tube 603. The rotating shaft of the motor is connected to the rotating shaft via the geared box, this rotating shaft is provided with the pin 202, and the pin 202 is engaged with the pin hole 604.

The micro motor is housed inside the handle-side housing (not illustrated), and in Example 9, the micro motor is configured to be rotationally driven with the electrical power from the chair unit power source. The rotating shaft of the micro motor is coupled to the geared box provided at a distal end portion of the handle-side housing, the output terminal of the geared box is connected to the rotating shaft 200, and the above pin 201 is provided in the rotating shaft 200 and is engaged with the pin hole 504.

Additionally, a vibration tube mounting opening 602 opens at a distal end part of the vibration-side housing 601 of the reciprocation generator 600, and the vibration tube 603 is mounted on the vibration tube mounting opening. The vibration tube 603 is provided inside the vibration-side housing 601 so as to be capable of vibrating in the forward-backward direction (upward-downward direction of FIG. 11). Additionally, a reamer mounting opening 606 opens at a rear end part of the above vibration tube 603, and when the above reamer 3 is mounted from the reamer mounting opening, the reamer is configured to be capable of being pushed in until the needle part 31 slips out of a needle-through hole 605 of the vibration tube 603 and a distal end part of the insertion part 30 comes into contact with the inside of the above needle-through hole 605. In addition, the reamer 3 can be fixed by screwing the screw cap 300 into the above reamer mounting opening 606. Therefore, replacement of the reamer 3 is performed by attaching and detaching the screw cap 300. The reamer 3 includes the insertion part 30 (knob part) and the needle part 31, and the needle part 31 bends flexibly.

In addition, although the vibration tube 603 is mounted on the vibration-side housing 601, a distal end exposed portion 607 of the vibration tube 603 protrudes from the vibration tube mounting opening 602 so as to be capable of being touched with a finger. Although the pin 202 on the rotating shaft side of the motor is engaged with the pin hole 604, this pin hole 604 is engraved over 360 degrees at the outer peripheral part of the vibration tube 603. Although the reason for this configuration will be described below, when the reamer 3 is inserted into the vibration tube 603 from the rear side and the screw cap 300 is screwed into the reamer mounting opening 606, the vibration tube 603 pivots freely beyond 360 degrees with respect to the vibration-side housing 601. Therefore, it is difficult to fasten the screw cap 300. However, when a fingertip is pressed against the distal end exposed portion 607, it is possible to suppress the rotation of the vibration tube 603 to tighten the screw cap 300.

Meanwhile, the electric reciprocation generator of the reamer of the invention is developed for the purpose of reciprocally driving the needlelike part of the reamer that bends flexibly. This is because there are problems in that the shape of bending of a root canal varies depending on individual patients or depending on individual teeth even in the same patient, there is a case where it is difficult to pull out the needlelike part in a case where the needlelike part is forced to enter forward from a bent spot of the root canal, and the needlelike part is bent or damaged, or if the worst happens, the needlelike part is lost and remains at a root apex of the root canal.

Figure 13:
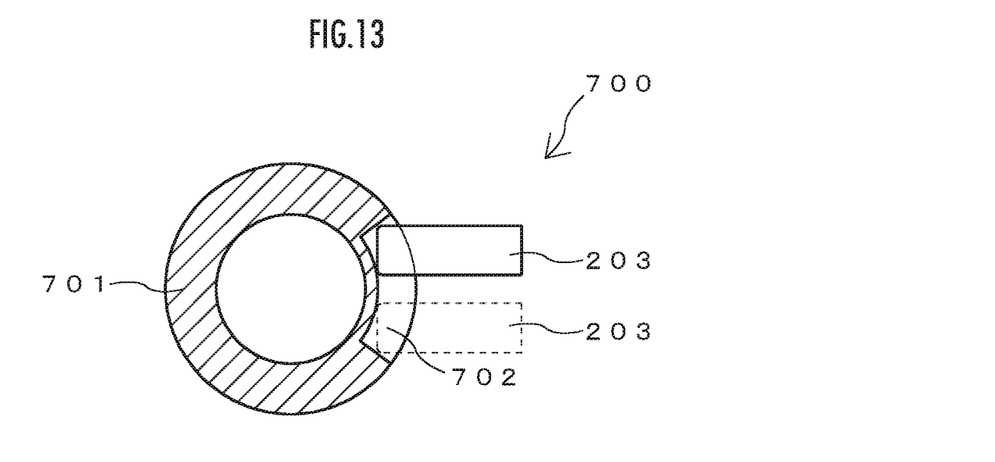
FIG. 13 is an illustrative view of Example 10.

Although the problems as described above have been greatly improved by this invention, the knowledge that it would be better if the vibration tube 603 is freely pivoted can be obtained as a result of having performed keen researches and developments. This free pivoting means that the vibration tube is not forcibly rotated and pivoted with a driving force, is made not to be simply fixed, and is freely moved without resisting an external force in both right and left directions. By configuring the invention in this way, even if there is resistance against the reciprocal motion of the reamer, or even if a root canal is likely to be bitten, it is possible to avoid that, twisting or bending of the needlelike part does not occur easily, and the reciprocal motion can be smoothly continued. Although FIG. 12 is a schematic view illustrating an operating state, the pin 202 of substantially the same diameter is inserted into the pin hole 604. Therefore, when the pin 202 connected to the rotating shaft of the motor in an eccentric state rotates (the moment when the pin 202 has moved from a position illustrated by a chain line to a position illustrated by a solid line is illustrated in FIG. 13), this rotary motion is converted into the reciprocal motion of the vibration tube 603 in the forward-backward direction of FIG. 13. On the other hand, since the pin hole 604 is engraved over 360 degrees at the outer peripheral part of the vibration tube 603, the vibration tube 603 can freely perform a pivoting motion in the direction of the arrow. This exactly makes the needlelike part of the reamer difficult to twist.

The pin hole 604 and the pin 202 of this example have the important working effects as described above. Moreover, there is also a synergistic effect between the smoothly repeated reciprocal motion and the flexible bending property of the needlelike part of the reamer, the moment when the needlelike part conveniently enters even the bent spot of the root canal occurs repeatedly, and consequently, the treatment of a cavity can be completed in a short time. In addition, when free pivoting is allowed, a phenomenon in which the needlelike part enters avoiding a filling or conversely the needlelike part moves back to take out an old filling while winding the filling therearound is also observed. This is an unexpected phenomenon also for the inventor.

Example 10

Figure 14:
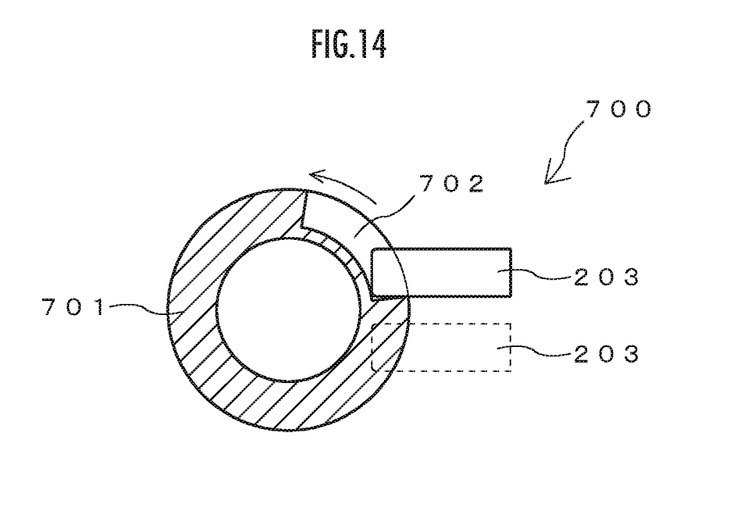
FIG. 14 is an illustrative view of an operating state.

Although the configuration of a reciprocation generator 700 of this example illustrated in FIGS. 13 and 14 imitates that of the reciprocation generator 600 in the above-described Example 9, a pin hole 702 provided in a vibration tube 701 is different from the pin hole 604 of Example 9 that is engraved over 360 degrees at the outer peripheral part of the vibration tube 603, and the pin hole 702 of Example 10 has a feature that the pin hole is engraved by approximately 27 degrees at the outer peripheral part of the vibration tube 701.

Although FIG. 14 is a schematic view illustrating an operating state, the pin 203 of substantially the same diameter is inserted into the pin hole 702. Therefore, when the pin 203 connected to the rotating shaft of the motor in an eccentric state rotates, this rotary motion is converted into the reciprocal motion of the vibration tube 701 in the forward-backward direction in the drawing. On the other hand, the pin hole 702 is engraved by 27 degrees at the outer peripheral part of the vibration tube 701. Therefore, for example, at the position of the pin 203 at the moment illustrated in FIGS. 13 and 14, the vibration tube 701 can freely perform a pivoting motion by the play of the pin hole 702. The presence of the play is important even if not as much as the pin hole 604 of Example 9, and even if an external force to temporarily twist the needlelike part of the reamer, that is, the vibration tube 701, is applied, the vibration tube 701 can afford to dodge this external force. It can also be said that the vibration tube 701 is pivotable. Even by this, the needlelike part of the reamer is not easily twisted, and smooth reciprocal motion can be continued. There are such important working effects in the pin hole 702 and the pin 203 of this example. In addition, the engraving angle of the pin hole 702 is optional. Additionally, as long as the engraving angle is not 360 degrees, it is apparent that a region such as the distal end exposed portion 607 of Example 9 may be present or not.

Therefore, the engraving angle of the pin hole 702 at the outer peripheral part of the vibration tube 701 so as to make the vibration tube 701 pivotable without forcibly pivoting the vibration tube 701 can also be defined as being equal to or more than the rotation diameter of the pin 203 and equal to or less than the entire circumference, and the engraving angle of the pin hole 702 can also be defined as being equal to or more than the rotation diameter of the pin 203 and less than the entire circumference if it is expected to eliminate a configuration such as the distal end exposed portion 607 provided so as to be capable of fastening the screw cap 300 in Example 9. In addition, in Example 9, the pin hole 604 is engraved over 360 degrees at the outer peripheral part of the vibration tube 603. However, even if a configuration such as an obstructive protruding part being provided inside the pin hole 604 so that the pin 202 can abut against the protruding part is adopted herein, it is possible to make the distal end exposed portion 607 unnecessary.

Even in this example, similarly to Example 9, the synergistic effect between the smoothly repeated reciprocal motion and the flexible bending property of the needlelike part of the reamer is seen. That is, even in the bent spot of the root canal, the needlelike part enters conveniently and repeatedly. Thus, the efficiency of treatment becomes excellent. Additionally, a phenomenon in which a filling is also taken out easily is seen similarly to Example 9,

INDUSTRIAL APPLICABILITY

The invention can reduce the burden on dentists, can improve the technique of treatment, and can contribute to the development of the industry. In addition, the invention is not limited only to the above-described examples. For example, in addition to a reciprocation generation unit including the above-described motor and a cam attached to the rotating shaft of the motor in an eccentric state, it is possible to incorporate a linear vibration generation device utilizing a magnetic suction repulsive force, a mechanical vibration generation device that utilizes winding-back of a spring, or the like.

DESCRIPTION OF REFERENCE NUMERALS

1: reciprocation generator
10: handle-side housing
11: charging terminal
12: supporting part
13: pivot shaft
14: vibration-side housing
15: vibration tube mounting opening
16: vibration tube
17: reamer mounting opening
18: spring
19: roller
2: motor
20: rotating shaft
21: plate cam
22: switch
23: input terminal
24: secondary battery
26: rotating plate
27: pin
28: rotating plate
29: pin
3: reamer
30: insertion part
31: needle part
32: reamer
33: insertion part
34: needle part
4: reciprocation rod
40: pin hole
5: reciprocation rod
50: link rod
51: sliding groove
52: coupling shaft
53: pivot shaft
6: reciprocation rod
60: insertion hole
61: crankshaft
7: multi-stage plate cam
70: first stage cam
71: second stage cam
72: third stage cam
73: roller
74: rotating shaft
75: switching rod
8: vibration-side housing
80: vibration tube mounting opening
81: vibration tube 82: reamer mounting opening
83: spring
84: roller
85: pressing spring
86: ball
87: eccentric weight
88: vibration tube
89: adapter mounting opening
9: adapter
90: rubber tube
91: reamer mounting opening
100: reciprocation generator
101: handle-side housing
102: vibration-side housing
103: vibration tube mounting opening
104: vibration tube
105: pin hole
106: needle-through hole
107: reamer mounting opening
108: guide pin
109: guide groove
200: rotating shaft
201: pin
202: pin
203: pin
300: screw cap
301: screw cap
302: screw cap
400: reciprocation generator
401: vibration-side housing
402: vibration tube mounting opening
403: vibration tube
404: pin hole
405: needle-through hole
406: reamer mounting opening
407: cutout part
408: guide pin
409: guide groove
500: reciprocation generator
501: vibration-side housing
502: vibration tube mounting opening
503: vibration tube
504: pin hole
505: needle-through hole
506: reamer mounting opening
507: receiving rubber
508: guide pin
509: guide groove
600: reciprocation generator
601: vibration-side housing
602: vibration tube mounting opening
603: vibration tube
604: pin hole
605: needle-through hole
606: reamer mounting opening
607: distal end exposed portion
700: reciprocation generator
701: vibration tube
702: pin hole

The invention claimed is:

1. A reciprocation generator for a dental reamer comprising:
a housing;
a pin eccentrically provided at a tip of a rotating shaft, the pin and shaft collectively provided as a reciprocation generation unit housed within the housing;
a vibration tube disposed within the housing and interfacing with the reciprocation generation unit; and
a reamer including an insertion part and a needlelike part, wherein
the vibration tube having a distal end with a needle-through hole sized to allow the needlelike part to fit therethrough and a rear end part with a hole as a reamer mounting opening,
the pin of the reciprocation generation unit is engaged with a pin hole provided in a side surface part of the vibration tube,
the reamer mounting opening is selectively closeable with a screw cap retained therein,
the vibration tube is pivotable with a longitudinal direction of the reamer as an axis by the pin hole being provided in a range equal to or more than a pivoting diameter of the pin and less than an entire circumference along an outer peripheral part of the vibration tube,
the needle-through hole has a smaller diameter than the insertion part of the reamer, and
when the reamer is inserted from the reamer mounting opening at the rear end part of the vibration tube toward the distal end of the vibration tube and housed in the vibration tube in a state wherein the vibration tube is disposed within the housing, the distal end of the insertion part of the reamer abuts the distal end of the vibration tube in an axial direction, the rear end of the insertion part of the reamer abuts the screw cap in the axial direction, thereby fixing the reamer inside the vibration tube, and the needlelike part protrudes from the distal end part of the vibration tube through the needle-through hole.

2. The reciprocation generator for a dental reamer according to claim 1,
wherein the reciprocation generation unit is designed to be capable of reciprocating the reamer at any distance within a distance of 0.5 mm to 2.0 mm.

3. The reciprocation generator for a dental reamer according to claim 1,
wherein a side wall part of the reamer mounting opening is provided with a hole part for weight reduction.

4. A reciprocation generator system for a dental reamer comprising:
the reciprocation generator for a dental reamer according to claim 1; and
a plurality of screw caps with different weights.

* * * * *